Nov. 30, 1937.  C. H. COTTON  2,100,470
VALVE
Filed July 23, 1935
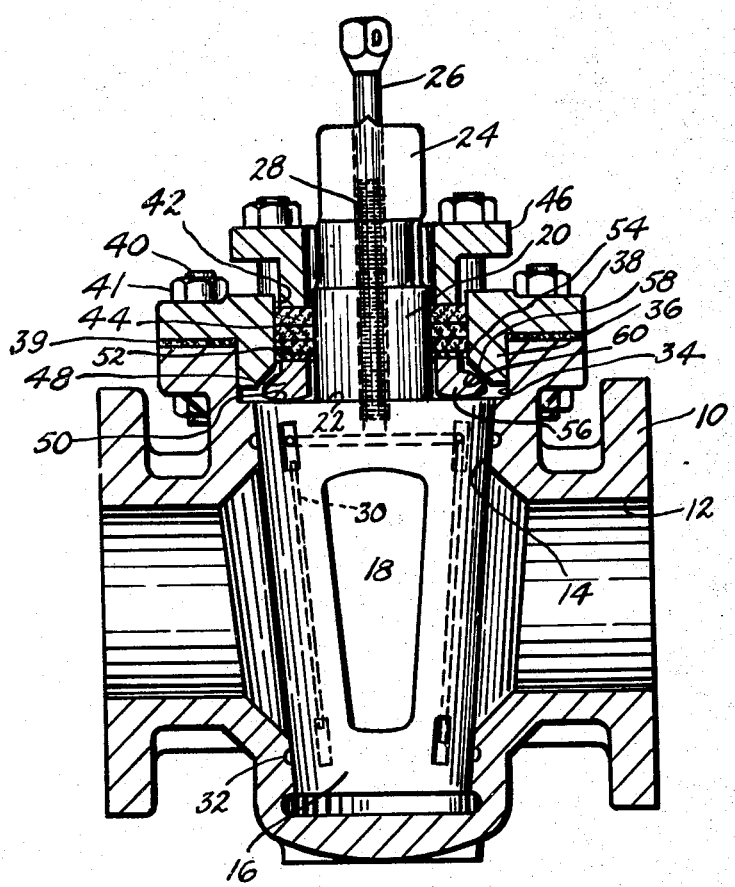
INVENTOR.
Charles H. Cotton
BY Albert J. Henderson
HIS ATTORNEY.

Patented Nov. 30, 1937

2,100,470

UNITED STATES PATENT OFFICE 2,100,470

VALVE

Charles H. Cotton, Kewanee, Ill., assignor to Walworth Patents, Inc., Boston, Mass., a corporation of Massachusetts Application July 23, 1935, Serial No. 32,765

5 Claims. (Cl. 251—103)

This invention relates to valves and more particularly to lubricated plug valves.

One object of the invention is to permit repacking a valve while under line pressure without leakage therefrom.

Another object of the invention is to prevent misalignment of the valve parts from causing leakage during the repacking operation.

Another object of the invention is to hold the valve member resiliently to its seat to permit jacking thereof by lubricant under pressure.

Another object of the invention is to promote easy turning of the valve member in its seat.

Other objects and advantages will become apparent from the following description taken in connection with the accompanying drawing which shows a longitudinal section through a valve embodying the invention.

Referring more particularly to the drawing the valve comprises a casing 10 having a fluid passageway 12 therethrough and a tapered valve seat 14 in which is seated a tapered valve member 16 having a port 18 adapted to register with the passageway 12 when the valve is in open position.

The valve member 16 is provided with a stem 20 defining a shoulder 22 on the valve member and having a suitably squared end 24 to receive a wrench by which the valve member can be rotated on its seat. Lubricant may be introduced under pressure to the valve seat 14 by means of the lubricant screw 26 threadedly engaging a reservoir 28 in the valve stem which communicates with longitudinal grooves 30 and circumferential or optionally spiral grooves 32 formed in the valve member 16 and its seat 14.

The casing 10 is provided at the larger end of the valve seat with an annular recess 34 for the reception of a depending flange portion 36 of a cover member 38 which may be secured to the casing 10 as by means of the bolts 40 and nuts 41. The depending portion 36 is preferably spaced from the shoulder 22 of the valve member and a gasket 39 may be interposed between the cover 38 and the casing 10 to prevent leakage between these members. The cover member 38 is provided with a bore 42 spaced from the periphery of the stem 20 to form a stuffing box. A resilient packing 44 is housed within the stuffing box and compressed therein by means of a packing gland 46.

This invention is more particularly directed toward providing means to permit the valve to be repacked while under line pressure without leakage therefrom and without interference with the normal resilient seating of the valve member which permits jacking of the latter from its seat for introducing lubricant under pressure thereto. In my co-pending application, Serial No. 722,840, I have disclosed a means of performing these functions with the use of an annular diaphragm construction, the outer end of which is fixedly held in the casing, and the inner end of which is maintained in sealing engagement with the valve member when the plug is disengaged from its seat. In certain services I have found it unnecessary to utilize such a diaphragm construction and inasmuch as such construction necessarily creates a certain amount of friction when the shoulder on the valve member is rotated against the stationary diaphragm, I have dispensed with the diaphragm and hence, the friction during rotation of the valve member in its seat is correspondingly reduced.

The sealing arrangement in this invention comprises an annular member or washer 48 having a rounded end face 50 which is adapted to be seated on the shoulder 22 of the valve member with its opposite end face 52 projecting within the stuffing box and engaging the packing 44. If desired, a thin metal washer or gasket 54 may be interposed between the end face 52 of the washer 48 and the packing. The washer 48 is further provided with a flange 56 which projects from one side thereof into proximate relation with the flange portion 36 of the cover member which overlies the shoulder 22 of the valve member. The inner peripheral edge of the flange portion 36 adjacent the washer 56 may be suitably beveled as at 58 to form a seating surface and the related edge 60 of the projection 56 may be provided with a curvature for engaging the seating surface 58 as will be hereinafter described. It will, of course, be understood that these conformations could be reversed and the beveled portion be placed on the washer 48 and the curvature on the flange portion 36.

When the valve member 16 is held in engagement with its seat 14 by pressure applied through the packing 44 and the gland 46 the seating surfaces 58 and 60 on the cover 38 and washer 48 respectively are normally spaced one from the other. This space has been exaggerated in the drawing for the purpose of clarity in illustration and it will be understood that in practice it is but a few thousandths of an inch in size.

From the foregoing description of the improved construction it will be apparent that the valve member is resiliently held to its seat and may be lifted or jacked therefrom whether the valve is open or closed by the vertical component of pressure set up by the lubricant under pressure in the grooves 30 and 32 acting on the tapered seating surface. The lifting action of the valve member 16 during normal use of the valve may cause the washer 56 to move into engagement with the cover member 38 but ample clearance is afforded at this point, as described. The projection of the annular member partly within the stuffing box prevents extrusion of the packing therefrom between the seating surfaces 58 and 60.

Accordingly, the normal operation of a lubricated plug valve is not interfered with in any way by this invention which, as will now be described, permits the packing 44 to be replaced while the valve is under pressure from the fluid passing therethrough.

The repacking of the valve while under pressure may be accomplished by removing the packing gland 46 whereupon the packing 44 and gasket 52 may be withdrawn from the stuffing box. It will be apparent that upon relieving the valve member from the pressure of the packing it will rise in its seat due to the unbalanced pressure in the valve. The valve member is however, prevented from being blown entirely out of the casing by the engagement of the flange 56 of the washer 48 with the seating surface 58 of the cover member 38. As previously stated, the space between these members when the valve is seated is but a few thousandths of an inch and the lift on the valve member will therefore barely be discernible. Due to the curvature on the end face 50 of the washer 48 and on the seating surface 60 of the cover 38 any tilting movement of the valve member as it rises from its seat will not prevent the seating surfaces from adopting a line-to-line contact and providing a leak-proof seal. Furthermore, such a contact will occur even if the cover member 38 is not secured squarely in position on the body 10 but is tilted due to the uneven tightening of the nuts 41 on assembly or other causes. In such event the washer 48 will rock on the shoulder 22 of the valve member and thus find a true seat against the surface 58 of the cover when the packing 44 is removed. Consequently, the loosely mounted washer insures that the stuffing box will be sealed against leakage when the valve is being repacked under line pressure.

From the foregoing description it will be apparent that all of the objects of the invention have been accomplished in a simple and economical manner and various modifications could be made within the scope of the appended claims without departing from the spirit of the invention.

I claim:

1. A valve comprising a casing having a valve seat, a valve member movable on said seat, a cover at one end of the valve member and secured to the casing, a stem extending from the valve member through said cover and spaced therefrom to form a stuffing box, a packing for the valve member housed within said stuffing box, a gland for exerting pressure on said packing and thereby holding said valve member in engagement with its seat, and means for sealing the valve against leakage when the packing is removed, said means including a member loosely mounted between and engaging the packing and valve member, said member projecting partly within said stuffing box and being adapted for sealing engagement with the cover.

2. A valve comprising a casing having a valve seat, a valve member movable on said seat, a cover at one end of the valve member and secured to the casing, a packing for the valve member associated with the cover, a gland for exerting pressure on said packing and thereby holding the valve member in engagement with its seat, and means for sealing the valve against leakage when the packing is removed, said means including a floating annular member mounted between and engaging the packing and valve member, said annular member and cover having cooperating seating surfaces one of which is beveled and the other having a curvature.

3. A valve comprising a casing having a valve seat, a valve member movable on said seat, a cover overlying one end of the valve member and secured to the casing, a stem extending from the valve member through said cover and spaced therefrom to form a stuffing box, a packing for the valve member housed within said stuffing box, a gland for exerting pressure on said packing and thereby holding the valve member in engagement with its seat, means for sealing the valve against leakage when the packing is removed, said means including a floating annular member mounted between and engaging the packing and valve member, said annular member projecting partly within the stuffing box, and a flange on said annular member extending between the overlying portion of the cover and the valve member, said flange and cover having seating surfaces adapted for sealing engagement.

4. A valve comprising a casing having a tapered valve seat, a tapered valve member engaging said seat, a cover secured to the casing and having a portion overlying the valve member but normally spaced therefrom, a packing for the valve member associated with the cover, a gland for exerting pressure on said packing and thereby holding the valve member in engagement with its seat, means for sealing the valve against leakage when the packing is removed, said means including a floating annular member mounted between and engaging the packing and valve member, and a flange on said annular member extending into proximate relation with the overlying portion of said cover, said flange and overlying portion having cooperating seating surfaces one of which is beveled and the other having a curvature.

5. A valve, comprising a casing having a tapered valve seat, a tapered valve member engaging said seat, the casing being provided with an annular recess surrounding the larger end of the valve seat, a cover secured to the casing and having a flanged portion depending into the recess and overlying the valve member, said flanged portion having a beveled end face, a stem extending from the valve member and spaced from the flanged portion of the cover to form a stuffing box, said stem defining a shoulder on the valve member, a packing in the stuffing box, a packing gland on the cover for compressing the packing and holding the valve member in engagement with its seat, means for sealing the valve against leakage when the packing is removed, said means including a floating metal washer having a rounded end face engaging the valve shoulder and its opposite face engaging the packing, and a flange on said washer extending into proximate relation with the flanged portion of the cover, said flange having a rounded seating surface normally spaced from the beveled end face of the flanged portion but being engageable therewith when the valve member is disengaged from its seat.

CHARLES H. COTTON.